United States Patent [19]
Weber et al.

[11] Patent Number: 5,310,103
[45] Date of Patent: May 10, 1994

[54] VEHICLE TRUCK LID MOUNTED ACCESSORY CARRIER CASE ASSEMBLY

[76] Inventors: Melvin W. Weber, 142 Oakland, Rapid City, S. Dak. 57701; Robert L. Olson, R.R. 8, Box 2210, both of Rapid City, S. Dak. 57702

[21] Appl. No.: 9,546

[22] Filed: Jan. 26, 1993

[51] Int. Cl.[5] ............................................. B60R 7/02
[52] U.S. Cl. ..................... 224/311; 224/901; 224/922
[58] Field of Search ............... 224/311, 282, 922, 901

[56] References Cited

U.S. PATENT DOCUMENTS

| | | | |
|---|---|---|---|
| 1,903,798 | 4/1933 | Turner | 224/922 |
| 3,473,680 | 10/1969 | Downer | 224/311 |
| 3,678,611 | 7/1972 | Files | 224/922 |
| 4,170,801 | 10/1979 | Ward | 224/922 |
| 4,180,299 | 12/1979 | Tolerson | 224/311 |
| 4,523,704 | 6/1985 | Washington | 224/922 |
| 4,750,658 | 6/1988 | Jennings | 224/901 |
| 5,007,569 | 4/1991 | Zarb | 224/901 |

Primary Examiner—Renee S. Luebke
Attorney, Agent, or Firm—John R. Flanagan

[57] ABSTRACT

An accessory carrier case assembly mountable on a support structure, such as the underside of a vehicle trunk lid, includes an elongated case having a latchable bottom tray and top lid. The bottom tray and top lid are padded with a foam material. The bottom tray has an interior structure defining different compartments for various items of fishing equipment. The top lid and bottom tray have sufficient interior space for accommodating fishing rods therein. The accessory carrier case assembly also includes an arrangement of rigid mounting brackets, flexible holding straps, and flexible hook and loop releasable fastening strips for supporting the carrier case on the underside of the trunk lid. The releasable fastening strips are applied respectively on the holding straps and on either the top lid or bottom tray of the carrier case for releasably supporting the carrier case from the underside of the trunk lid.

20 Claims, 1 Drawing Sheet

U.S. Patent  May 10, 1994  5,310,103
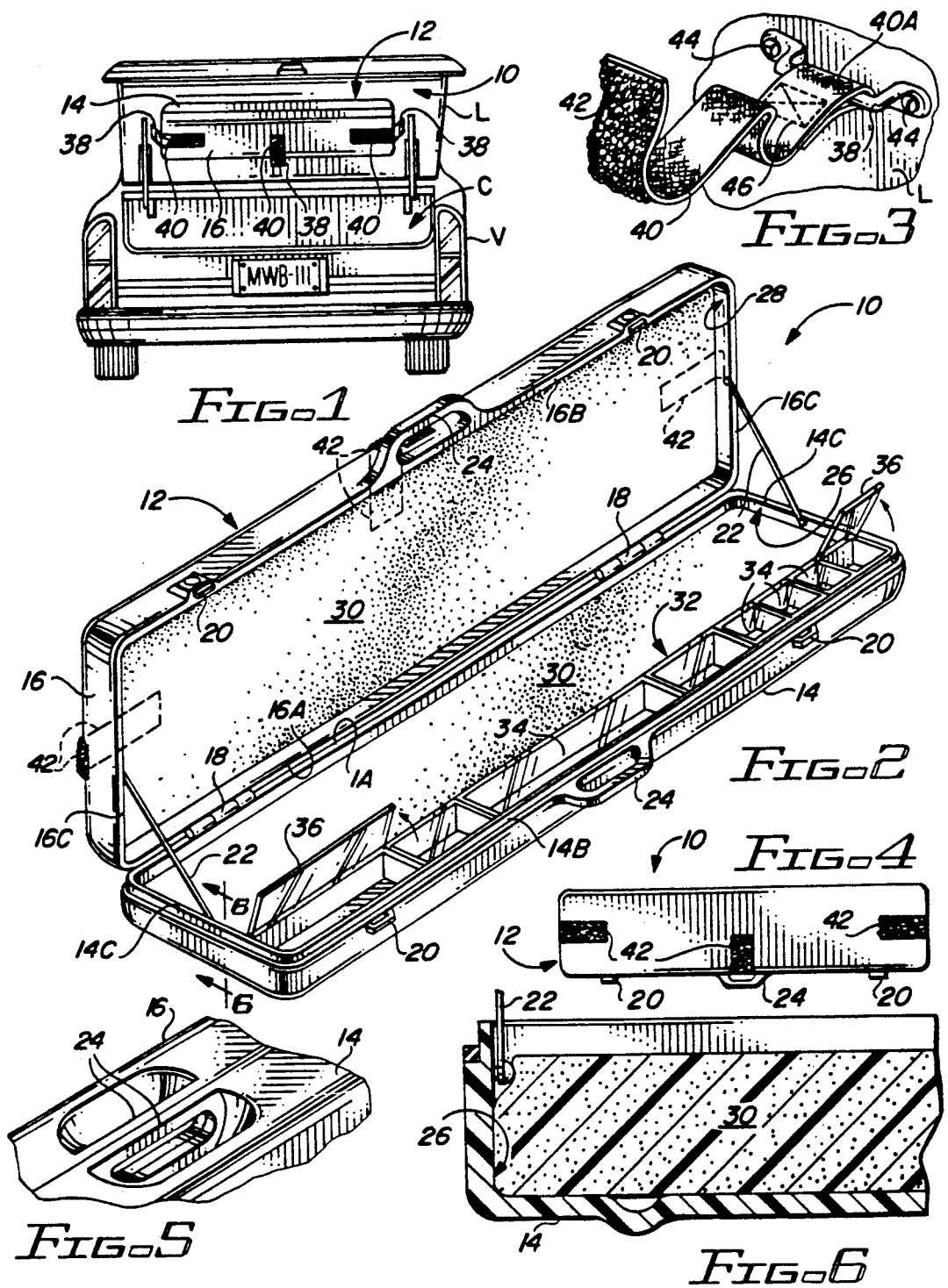

VEHICLE TRUCK LID MOUNTED ACCESSORY CARRIER CASE ASSEMBLY

BACKGROUND OF THE INVENTION

1. Field of the Invention

The present invention generally relates to cases for carrying accessories, such as fishing tackle and the like and, more particularly, is concerned with a vehicle trunk lid mounted accessory carrier case assembly.

2. Description of the Prior Art

Many fisherman transport a plurality of fishing rods and other fishing tackle with them when they go on long fishing trips. As a result, fishermen typically utilize various forms of carrier cases in which one or more fishing rods and other fishing tackle may be housed. Representative of the carrier cases known in the prior patent art are the ones disclosed in U.S. Pat. Nos. to Files (3,678,611), Ward (4,170,801) and Washington (4,523,704). Ordinarily, these cases have hinged top and bottom housing sections of substantial lengths for accommodating several fishing rods.

Whereas the carrier case of the Washington patent is designed to be carried on the roof of the vehicle, most fishermen prefer to carry their cases in the trunks of their vehicles in order to avoid exposure of the cases to the adverse elements of the weather. However, due to their substantial lengths, the carrier cases occupy a considerable amount of trunk space, reducing the amount of space available for other items typically taken on fishing trips.

Consequently, a need exists for a way to store a fishing tackle carrier case in a vehicle trunk so as to optimize the utilization of available space.

SUMMARY OF THE INVENTION

The present invention provides a vehicle trunk lid mounted accessory carrier case assembly designed to satisfy the aforementioned need. The accessory carrier case assembly of the present invention allows mounting of the carrier case to the underside of the trunk lid so as to occupy a portion of the space within the trunk compartment of the vehicle which otherwise would not be fully utilized. Also, the accessory carrier case assembly includes components which permit quick and easy dismounting of the carrier case from the underside of the trunk lid.

Accordingly, the present invention is directed to an accessory carrier case assembly mountable on a support structure. The accessory carrier case assembly comprises: (a) an elongated carrier case having a bottom tray and top lid and being adapted for containing items therein; (b) a plurality of mounting brackets attachable on the support structure; (c) a plurality of flexible holding straps connected on the mounting brackets; and (d) a plurality of releasable fastening means for releasably securing the flexible holding straps in a predetermined arrangement on the carrier case for supporting the carrier case on the support surface. The releasable fastening means are flexible hook and loop releasable fastening strips applied on the flexible holding straps and on either the bottom tray or top lid of the carrier case.

The bottom tray and top lid of the case are hinged together for movement between opened and closed positions. The carrier case has a pair of handles mounted respectively on the bottom tray and top lid thereof. The handles are disposed in a side-by-side relationship with one another when the bottom tray and top lid are in the closed position. The bottom tray and top lid have interiors padded with a foam material. The bottom tray has an interior structure defining a plurality of compartments for containing a plurality of items.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a rear view of a trunk compartment of a vehicle with the trunk lid open and the accessory carrier case assembly of the present invention supported on the underside of the trunk lid.

FIG. 2 is a perspective view of a carrier case of the accessory assembly showing a top lid and a bottom tray of the carrier case.

FIG. 3 is a perspective fragmentary view of one mounting bracket and holding strap of the accessory assembly for releasably supporting the carrier case to the underside of the trunk lid.

FIG. 4 is a top plan view of the carrier case with releasable fastening strips of the accessory assembly applied thereon for attachment to complementary releasable fastening strips on the holding straps.

FIG. 5 is an enlarged fragmentary view of the carrier case showing an alternative design of a handle of the carrier case.

FIG. 6 is an enlarged fragmentary sectional view of the carrier case taken along line 6—6 of FIG. 2.

DETAILED DESCRIPTION OF THE INVENTION

Referring to the drawings and particularly to FIG. 1, there is illustrated a vehicle V having a trunk storage compartment C opened and closed by a trunk lid L. Mounted to the underside of the trunk lid L is an accessory carrier case assembly, generally designated 10, in accordance with the present invention. The accessory assembly 10 includes an elongated carrier case 12 mountable to the underside of the trunk lid L by the remaining components of the accessory assembly 10. While the carrier case 12 is illustrated and will be described supported on the underside of the trunk lid L, the remaining components of the accessory assembly 10 can just as readily be employed for mounting the carrier case 12 to other support surfaces.

Referring to FIG. 2, the elongated carrier case 12 has an elongated bottom tray 14 and an elongated top lid 16 of generally rectangular configurations and the same sizes. The bottom tray 14 and top lid 16 are fabricated of a suitable rigid material, such as plastic or metal. The carrier case 12 includes a plurality of hinges 18 spaced apart from one another and connected with and extending between a first pair of adjacent longitudinal edges 14A, 16A of the bottom tray 14 and top lid 16 so as to pivotally hinge them together for movement between opened and closed positions, as shown respectively in FIGS. 2 and 4.

Referring to FIGS. 2 and 6, the carrier case 12 also includes a pair of latch mechanisms 20 spaced apart from one another along a second pair of adjacent longitudinal edges 14B, 16B. The latch mechanisms 20 are operable for latching the bottom tray 14 and top lid 16 together in the closed position and for unlatching the bottom tray 14 and top lid 16 from one another to permit moving of the bottom tray 14 and top lid 16 relative to one another to the opened position. The carrier case 12 further includes a pair of flexible cords 22 secured between opposite pairs of adjacent side edges 14C, 16C of the bottom tray 14 and top lid 16 for limiting relative pivotal movement of the bottom tray 14 and top lid 16 away from one another.

Referring to FIGS. 2 and 5, the carrier case 12 also includes a pair of handles 24 mounted respectively, such as being integrally formed, on the latched edges 14B, 16B of the bottom tray 14 and top lid 16. The handles 24 are disposed in a close side-by-side relationship with one another when bottom tray 14 and top lid 16 are disposed in the closed position. In an alternative form shown in FIG. 5, the handles 24 are recessed in the bottom tray 14 and top lid 16 of the carrier case 12.

Referring to FIGS. 2 and 6, the bottom tray 14 and top lid 16 of the carrier case 12 have sufficient interior space for containing and accommodating a plurality of items therein, such as fishing rods with reels intact and other fishing tackle asscessories (not shown). Both the bottom tray 14 and top lid 16 define large interior compartments 26, 28 which are padded with a foam material 30. Also, the bottom tray 14 has an interior structure 32 defining a plurality of compartments 34 for containing a plurality of items, such as fish hooks, lures, stringing, pliers, and the like (not shown). Some or all of the compartments 34 can be covered by a pivotal lid or lids 36 or by using fishing tackle utility boxes of different sizes with lids.

Referring to FIGS. 1 to 4, the remaining components of the accessory assembly 10 includes a plurality of rigid U-shaped mounting brackets 38, a plurality of flexible holding straps 40, and a plurality of releasable fastening means 42, such as strips of hook and loop material. The mounting brackets 38 are attachable, such as by screws 44, on the underside of the trunk lid L. The flexible holding straps 40 are connected in any suitable manner to the mounting brackets 38. For example, as shown in FIG. 3, an end portion 40A of each of the holding straps 40 is folded back upon itself and the overlapped areas are secured together at 46 in any suitable manner, such as by stitching, to define the end portion 40A in a loop configuration through which the respective one of the mounting brackets 38 can be inserted prior to being attached on the trunk lid L.

The plurality of strips 42 of complementary releasable hook and loop fastening material are applied in any suitable manner on the flexible holding straps 40 and on an exterior surface of either the bottom tray 14 or the top lid 16 for releasably securing the flexible holding straps 40 to the carrier case 12 for supporting the carrier case 12 on the underside of the trunk lid L. Specifically, the flexible hook and loop releasable fastening strips 42 applied on holding straps such as by stitching or weaving and on the exterior surface of the top lid 16 of the carrier case 12 by glueing. The desired arrangement of the mounting brackets 38, holding straps 40, and fastening strips 42 at opposite ends and at the middle of the carrier case 12 is shown in FIGS. 1, 2 and 4. As an alternative, fasteners such as snaps could be employed instead of the strips of hook and loop fastening material.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

We claim:

1. An accessory carrier case assembly mountable on a support structure, comprising:
   (a) an elongated carrier case having a bottom tray and top lid and being adapted for containing items therein, said bottom tray and top lid of said carrier case being hinged together for movement between opened and closed positions, said carrier case also having a pair of handles mounted respectively on said bottom tray and top lid and being disposed in side-by-side relationship with one another when said bottom tray and top lid are in said closed position;
   (b) a plurality of mounting brackets attachable on a support structure;
   (c) a plurality of flexible holding straps attached on said mounting brackets; and
   (d) a plurality of releasable fastening means for releasably securing said holding straps in a predetermined arrangement on said carrier case for supporting said carrier case on the support structure.

2. The assembly on claim 1 wherein said carrier case has a latch mechanism operable for latching said bottom tray and top lid together in said closed position and for unlatching said bottom tray and top lid from one another to move said bottom tray and top lid to said opened position.

3. The assembly of claim 1 wherein said handles are recessed in said bottom tray and top lid of said carrier case.

4. The assembly of claim 1 wherein said bottom tray has a structure defining a plurality of compartments for containing a plurality of items.

5. The assembly of claim 1 wherein said top lid and bottom tray have sufficient interior space for accommodating a plurality of items in said carrier case.

6. An accessory carrier case assembly mountable on a support structure, comprising:
   (a) an elongated carrier case having a bottom tray and top lid and being adapted for containing items therein, said bottom tray having an interior padded with a foam material;
   (b) a plurality of mounting brackets attachable on a support structure;
   (c) a plurality of flexible holding straps attached on said mounting brackets; and
   (d) a plurality of releasable fastening means for releasably securing said holding straps in a predetermined arrangement on said carrier case for supporting said carrier case on the support structure.

7. An accessory carrier case assembly mountable on a support structure, comprising:
   (a) an elongated carrier case having a bottom tray and top lid and being adapted for containing items therein, said top lid having an interior padded with a foam material;
   (b) a plurality of mounting brackets attachable on a support structure;
   (c) a plurality of flexible holding straps attached on said mounting brackets; and
   (d) a plurality of releasable fastening means for releasably securing said holding straps in a predetermined arrangement on said carrier case for supporting said carrier case on the support structure.

8. An accessory carrier case assembly mountable on a support structure, comprising:
 (a) an elongated carrier case having a bottom tray and top lid and being adapted for containing items therein;
 (b) a plurality of mounting brackets attachable on a support structure;
 (c) a plurality of flexible holding straps attached on said mounting brackets; and
 (d) a plurality of releasable fastening means for releasably securing said holding straps in a predetermined arrangement on said carrier case for supporting said carrier case on the support structure, said fastening means being flexible hook and loop releasable fastening strips applied on said holding straps and on either said bottom tray or top lid of said carrier case.

9. The assembly of claim 8 wherein said bottom tray and top lid of said carrier case are hinged together for movement between opened and closed positions.

10. The assembly of claim 9 wherein said carrier case has a pair of handles mounted respectively on said bottom tray and top lid and being disposed in side-by-side relationship with one another when said bottom tray and top lid are in said closed position.

11. In combination with a vehicle trunk lid, an accessory carrier case assembly mounted to an underside of said trunk lid, said assembly comprising:
 (a) an elongated carrier case having a bottom tray and top lid and being adapted for containing items therein;
 (b) a plurality of mounting brackets attached on an underside of said trunk lid;
 (c) a plurality of flexible holding straps attached on said mounting brackets; and
 (d) a plurality of releasable fastening means applied on said holding straps and on an exterior surface of either said top lid or bottom tray for releasably securing said holding straps to said carrier case for supporting said carrier case on said underside of said trunk lid.

12. The assembly of claim 11 wherein said bottom tray and top lid of said carrier case are hinged together for movement between opened and closed positions.

13. The assembly of claim 12 wherein said carrier case has a latch mechanism operable for latching said bottom tray and top lid together in said closed position and for unlatching said bottom tray and top lid from one another to move said bottom tray and top lid to said opened position.

14. The assembly of claim 12 wherein said carrier case has a pair of handles mounted respectively on said bottom tray and top lid and being disposed in side-by-side relationship with one another when said bottom tray and top lid are in said closed position.

15. The assembly of claim 14 wherein said handles are recessed in said bottom tray and top lid of said carrier case.

16. The assembly of claim 11 wherein said bottom tray has an interior padded with a foam material.

17. The assembly of claim 11 wherein said top lid has an interior padded with a foam material.

18. The assembly of claim 11 wherein said bottom tray has an interior structure defining a plurality of compartments for containing a plurality of items.

19. The assembly of claim 11 wherein said top lid and bottom tray have sufficient interior space for accommodating a plurality of items in said carrier case.

20. The assembly of claim 11 wherein said fastening means are flexible hook and loop releasable fastening strips applied on said holding straps and on either said bottom tray or top lid of said carrier case.

* * * * *